United States Patent
Sengupta et al.

(10) Patent No.: US 8,077,157 B2
(45) Date of Patent: Dec. 13, 2011

(54) DEVICE, SYSTEM, AND METHOD OF WIRELESS TRANSFER OF FILES

(75) Inventors: Uttam K. Sengupta, Portland, OR (US); Sreekant S Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 888 days.

(21) Appl. No.: 12/058,780

(22) Filed: Mar. 31, 2008

(65) Prior Publication Data

US 2009/0244015 A1    Oct. 1, 2009

(51) Int. Cl.
*G09G 3/041*    (2006.01)

(52) U.S. Cl. ......... 345/173; 345/158; 345/1.2; 345/174; 463/2; 463/36

(58) Field of Classification Search ............ 345/1.1, 345/3.1, 173, 156, 158, 169, 174, 175; 463/37, 463/38, 31, 1–5; 273/148 B
See application file for complete search history.

(56) References Cited

U.S. PATENT DOCUMENTS

| | | | |
|---|---|---|---|
| 6,331,840 B1 * | 12/2001 | Nielson et al. | 345/1.1 |
| 6,545,669 B1 * | 4/2003 | Kinawi et al. | 345/173 |
| 6,590,568 B1 * | 7/2003 | Astala et al. | 345/173 |
| 7,751,834 B2 * | 7/2010 | Park et al. | 455/456.2 |
| 7,880,728 B2 * | 2/2011 | de los Reyes et al. | 345/173 |
| 7,884,805 B2 * | 2/2011 | Thorn | 345/173 |
| 2006/0019648 A1 * | 1/2006 | Richard et al. | 455/420 |
| 2007/0066323 A1 * | 3/2007 | Park et al. | 455/456.2 |
| 2007/0075915 A1 * | 4/2007 | Cheon et al. | 345/1.1 |
| 2007/0146347 A1 * | 6/2007 | Rosenberg | 345/173 |
| 2008/0039212 A1 * | 2/2008 | Ahlgren et al. | 463/46 |
| 2008/0143685 A1 * | 6/2008 | Lee et al. | 345/173 |
| 2008/0254898 A1 * | 10/2008 | Endo | 463/43 |
| 2009/0017799 A1 * | 1/2009 | Thorn | 455/414.1 |
| 2009/0140986 A1 * | 6/2009 | Karkkainen et al. | 345/173 |
| 2010/0001952 A1 * | 1/2010 | Hiratake et al. | 345/158 |
| 2010/0267443 A1 * | 10/2010 | Shimamura et al. | 463/23 |
| 2011/0081923 A1 * | 4/2011 | Forutanpour et al. | 455/457 |
| 2011/0083111 A1 * | 4/2011 | Forutanpour et al. | 715/863 |

* cited by examiner

*Primary Examiner* — Lun-Yi Lao
*Assistant Examiner* — Tom Sheng
(74) *Attorney, Agent, or Firm* — Kacvinsky Daisak, PLLC (57) ABSTRACT

Device, system, and method of wireless transfer of files. For example, a method includes: identifying a selection of a representation of a digital object stored in a mobile device by detecting contact on a touch-sensitive surface of the mobile device at a contact position that corresponds to said representation; identifying a directional movement of said contact position on the touch-sensitive surface; and in response to said directional movement, wirelessly transferring data corresponding to the digital object to a nearby computing device.

16 Claims, 4 Drawing Sheets

DEVICE, SYSTEM, AND METHOD OF WIRELESS TRANSFER OF FILES

BACKGROUND

A user may utilize a mobile device (e.g., a laptop computer, a Personal Digital Assistant (PDA) device, a mobile phone, or the like) in order to maintain and use various files, for example, image files, audio files, video files, and word processing files. Such files may be created by the user (e.g., using a keyboard or keypad, by recording using a microphone, or using a digital camera) or may be received from third parties (e.g., via electronic mail, or by downloading from the World Wide Web).

Transferring or copying a file from the mobile device to another device may be time consuming, effort consuming, or error-prone. For example, the user may be required to physically connect cables between the devices, and/or to set and configure communication protocols between the devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments of the invention. However, it will be understood by persons of ordinary skill in the art that some embodiments may be practiced without these specific details. In other instances, well-known methods, procedures, components, units and/or circuits have not been described in detail so as not to obscure the discussion.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a "Carry Small Live Large" (CSLL) device, an Ultra Mobile Device (UMD), an Ultra Mobile PC (UMPC), a Mobile Internet Device (MID), a Consumer Electronic (CE) device, an on-board device, an off-board device, a hybrid device (e.g., a device incorporating functionalities of multiple types of devices, for example, PDA functionality and cellular phone functionality), a vehicular device, a non-vehicular device, a mobile or portable device, a non-mobile or non-portable device, a wireless communication station, a wireless communication device, a wireless Access Point (AP), a wireless Base Station (BS), a Mobile Subscriber Station (MSS), a wired or wireless Network Interface Card (NIC), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.16m standards and/or future versions and/or derivatives and/or Long Term Evolution (LTE) of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or tag or transponder, a device which utilizes Near-Field Communication (NFC), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, a "smartphone" device, a wired or wireless handheld device (e.g., BlackBerry®, Palm®Treo™, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDM Access (OFDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, Multi-Carrier Modulation (MDM), Discrete Multi-Tone (DMT), Bluetooth®, Global Positioning System (GPS), IEEE 802.11 ("Wi-Fi"), IEEE 802.16 ("Wi-Max"), ZigBee™, Ultra-Wideband (UWB), Global System for Mobile communication (GSM), 2G, 2.5G, 3G, Third Generation Partnership Project (3GPP), 3.5G, or the like. Some embodiments may be used in conjunction with various other devices, systems and/or networks.

The terms "wireless device" or "wireless computing device" as used herein include, for example, a device capable of wireless communication, a communication device or communication station capable of wireless communication, a desktop computer capable of wireless communication, a mobile phone, a cellular phone, a laptop or notebook computer capable of wireless communication, a PDA capable of wireless communication, a handheld device capable of wireless communication, a portable or non-portable device capable of wireless communication, or the like.

The terms "mobile device" or "mobile computing device" as used herein include, for example, a device capable of wireless communication, a communication device or communication station capable of wireless communication, a computer capable of wireless communication, a mobile phone, a cellular phone, a laptop or notebook computer capable of wireless communication, a PDA capable of wireless communication, a handheld device capable of wireless communication, a portable device capable of wireless communication, or the like.

The terms "file" or "digital file" or "object" or "digital object" include, for example, a digital item which is the subject of transferring or copying between a first device and a second device; a software application; a computer file; an executable file; an installable file or software application; a set of files; an archive of one or more files; an audio file (e.g., representing music, a song, or an audio album); a video file or audio/video file (e.g., representing a movie or a movie clip); an image file; a photograph file; a set of image or photograph files; a compressed or encoded file; a computer game; a computer application; a utility application; a data file (e.g., a word processing file, a spreadsheet, or a presentation); a multimedia file; an electronic book (e-book); a combination or set of multiple types of digital items; or the like.

The terms "sending device" or "source device" as used herein include, for example, a device that sends, transfer or copies a digital object using a wireless medium to another device. The terms "receiving device" or "destination device" or "target device" as used herein include, for example, a device that receives (or is intended to receive) a digital object using a wireless medium from the sending device.

The term "user" as used herein includes, for example, a person or entity that owns a computing device or a wireless device; a person or entity that operates or utilizes a computing device or a wireless device; or a person or entity that is otherwise associated with a computing device or a wireless device.

The term "touch-screen" as used herein includes, for example, a touch-sensitive or contact-sensitive surface or screen; a touch-responsive screen or surface; a screen or surface able to sense touching by a human finger and/or by a stylus or other pointing device; a screen or surface able to present or display text and/or graphics as well as able to sense touching by a human finger and/or by a stylus or other pointing device; a display able to detect the location of touch(es) within the display area or within portions thereof; a screen capable of operating as a display unit and as an input unit; a touch-screen of a PDA device; a touch-screen of a mobile phone; a touch-screen of a tablet PC; a resistive based touch-screen; a capacitive based touch-screen; an InfraRed (IR) based touch-screen; a Surface Acoustic Wave (SAW) touch-screen; a strain gauge touch-screen; an optical imaging based touch-screen; a dispersive signal based touch-screen; an acoustic pulse based touch-screen; an internal reflection based touch-screen; or the like. In some embodiments, the touch-screen may include a touchpad or touch-sensitive surface which operates as an input unit and does not necessarily operate as a display unit.

The terms "launch", "throw" or "flick" as used herein include, for example, rapid or accelerated directional movement of a user's finger or fingers over a touch-screen which resembles a one-way throwing or launching of an item towards an external target; a movement of a user's finger (or other pointer, e.g., stylus) starting by touching a representation of an object on the touch-screen, then rapidly (or using accelerative movement) dragging that representation towards a margin or border of the touch-screen, and then rapid releasing the representation of the object (e.g., without decelerating the movement, or without guiding the movement into a representation of a target file or a target folder); or other predefined movement or dragging of a representation of an object using a touch-screen, optionally resembling a throwing or launching movement of a small object, using a tip of a finger or a stylus or a pointing device.

Figure 1:
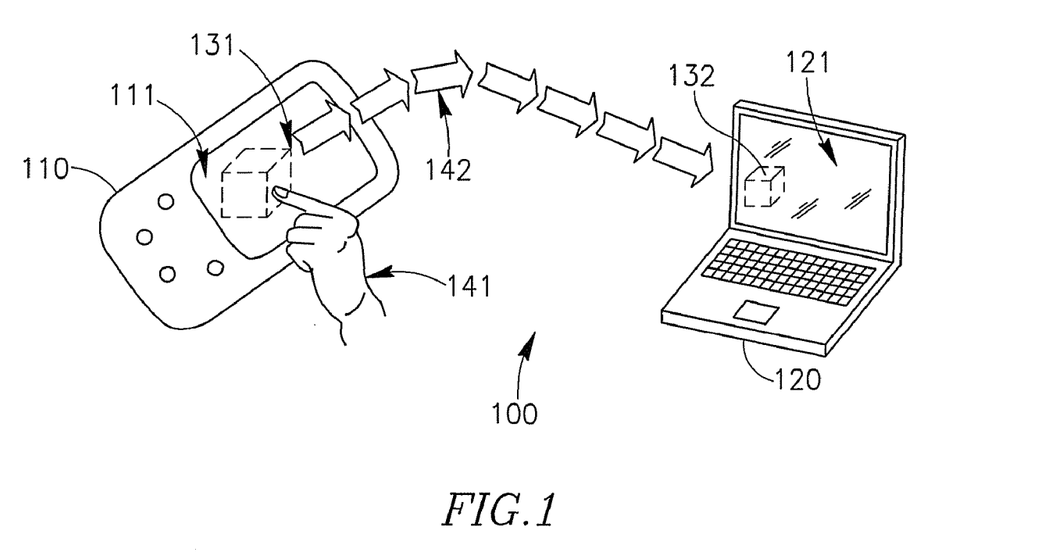
FIG. 1 is a schematic block diagram illustration of a system in accordance with some demonstrative embodiments of the invention.

FIG. 1 schematically illustrates a block diagram of a system 100 in accordance with some demonstrative embodiments of the invention. System 100 includes, for example, a sending device 110 and a receiving device 120. For demonstrative purposes, sending device 110 is shown implemented as a PDA device, and receiving device 120 is shown implemented as a laptop computer. Other types of devices may be used.

Sending device 110 may include, for example, a laptop computer, a notebook computer, a tablet computer, a PDA device, a cellular phone, a mobile phone, a hybrid device (e.g., combining one or more cellular phone functionalities with one or more PDA device functionalities), a portable audio player, a portable video player, a portable audio/video player, a portable media player, a portable device having a touch-screen, a relatively small computing device, a non-desktop computer or computing device, a portable device, a handheld device, a "Carry Small Live Large" (CSLL) device, an Ultra Mobile Device (UMD), an Ultra Mobile PC (UMPC), a Mobile Internet Device (MID), a Consumer Electronic (CE) device, an "Origami" device or computing device, a device that supports Dynamically Composable Computing (DCC), a context-aware device, or the like.

Receiving device 120 may include, for example, a laptop computer, a notebook computer, a tablet computer, a PDA device, a cellular phone, a mobile phone, a hybrid device (e.g., combining cellular phone functionalities with PDA device functionalities), a relatively small computing device, a non-desktop computer or computing device, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

In some embodiments, receiving device 120 may include non-mobile computing devices or peripherals, for example, a desktop computer, a Personal Computer (PC), a server computer, a printer, a laser printer, an inkjet printer, a color printer, a stereo system, an audio system, a video playback system, a DVD playback system a television system, a television set-top box, a television "cable box", a television converter box, a digital jukebox, a digital Disk Jockey (DJ) system or console, a media player system, a home theater or home cinema system, or the like.

In some embodiments, the sending device 110 may optionally include, for example, a processor, a memory unit, a storage unit, an input unit, an output unit, a communication unit (e.g., a wireless transmitter, a wireless receiver, a wireless transceiver), an Operating System (OS), one or more software applications, or other suitable hardware components and/or software components. Similarly, receiving device 120 may optionally include, for example, a processor, a memory unit, a storage unit, an input unit, an output unit, a communication unit (e.g., a wireless transmitter, a wireless receiver, a wireless transceiver), an Operating System (OS), one or more software applications, or other suitable hardware components and/or software components.

Sending device 110 may include a touch-screen 111, which may display a textual and/or graphical representation of a digital object 131. A user of the sending device 110 may point, position or orient the sending device 110 towards the receiving device 120 or in the direction of the receiving device 120; and may utilize his or her finger to launch or throw the representation of the digital object 131 towards the receiving device 120. The sending device 110 automatically detects the throwing movement, and wirelessly transfers to the receiving device 120 a copy 132 of the digital object 131. Accordingly, a screen 121 (e.g., not necessarily a touch-screen) of the receiving device 120 shows a representation of the copy 132 of the digital object 131.

In some embodiments, prior to "throwing" the digital object 131, the user of sending device 110 may be required to approve, activate, or turn-on the capability of sending device 110 to detect "throw" movements and to transfer digital object in response thereto. In some embodiments, the rights management on the digital object 131 to be thrown is checked, in order to determine whether or not that digital object 131 is allowed or authorized to be thrown. In other embodiments, sending device 110 may be pre-configured, as a default configuration, to be capable of detecting "throw" movements and of transferring digital object in response thereto, and the user of sending device 110 may selectively deactivate, disable, or turn-off this capability.

Similarly, in some embodiments, prior to "throwing" the digital object 131, the user of receiving device 120 may be required to approve, activate, or turn-on the capability of receiving device 120 to receive and/or accept digital objects "thrown" wirelessly at receiving device 120. In other embodiments, receiving device 120 may be pre-configured, as a default configuration, to receive and/or accept digital objects "thrown" wirelessly at receiving device 120, and the user of receiving device 120 may selectively deactivate, disable, or turn-off this capability.

In some embodiments, once the sending device 110 detects a "throw", the sending device 110 may notify the user of sending device 110 (e.g., using a textual notification, a graphical notification, an animated notification, an audio notification, or a video notification) that the "throw" operation was detected and that the copying of the digital object 131 is in progress (e.g., optionally showing a progress bar and/or a reverse time counter). Once the digital object 131 is successfully copied to receiving device 120, the sending device 110 may notify the user of sending device 110 that the "throw" operation was completed successfully. If the copying operation fails, sending device 110 may notify the user of sending device 110 that the "throw" operation failed, and may optionally provide details about possible reason(s) for the failure.

Similarly, once the receiving device 120 detects a commencement of an incoming wireless transfer of a "thrown" digital object 131, the receiving device 120 may notify the user of the receiving device 120 that a "throw" operation is in progress and that the copying of the digital object 131 is in progress (e.g., optionally showing a progress bar and/or a reverse time counter). Once the digital object 131 is successfully copied to the receiving device 120, the receiving device 120 may notify the user of the receiving device 120 that the "throw" operation was successfully completed. If the copying operation fails, the receiving device 120 may notify the user of the receiving device 120 that the "throw" operation failed, and may optionally provide details about the reason(s) or about possible reasons for the failure.

In some embodiments, optionally, the receiving device 120 may be configured to automatically perform one or more operations with the received copy 132 of the digital object 131. Such operations may include, for example, requesting a user's approval to open or execute the received digital object; automatically opening or executing the received objects; asking the user of the receiving device 120 whether to keep or to delete the received digital object; playing the received digital object; adding the received digital object to a play-list; performing a virus scan on the received digital object; or the like. In some embodiments, the digital object received may also be governed by Digital Rights Management (DRM) policies as defined by the content issuer or creator, for example, indicating the duration of persistence on the receiving device 120, the number of times that the content may viewed or played, or the like.

The wireless transferring or copying of digital object 131 from sending device 110 to receiving device 120 is performed using a wireless medium (indicated by arrows 142), using one or more wireless links, e.g., using IEEE 802.11 communication, IEEE 802.16 communication, Bluetooth communication, Ultra WideBand (UWB) communication, Near Field Communication (NFC), direct high-bandwidth PAN connections, InfraRed (IR) communication, Digital Living Network Alliance (DLNA) compliant or compatible communication, InfraRed Data Association (IRDA) compliant or compatible communication, synchronous or a-synchronous wireless communication, burstable or non-burstable wireless communication, ad-hoc wireless communication, LAN or PAN wireless communication, or the like.

Some embodiments may provide a User Interface (UI) method and mechanism which may be used for inter-device interaction and communication. For example, in some embodiments, sending device 110 is a portable or handheld device which stores a user's image files, audio files and video files; receiving device 120 is a nearby digital jukebox or a media player system; and when the sending device 110 is in proximity to the receiving device 120, the user of the sending device "throws" a representation of an audio file from his sending device 110 towards the receiving device 120; the receiving device 120 receives a copy of the "thrown" audio file, and plays it or adds it to the list of audio files to be played.

In some embodiments, the sending device 110 may combine capabilities of a CE device, a mobile phone and/or a computing device into a relatively small-sized device and/or using a highly mobile form factor. The sending device 110 may be used for On-The-Go (OTG) usage models, for example, Internet access OTG, location-based services OTG, entertainment OTG, or the like. In some embodiments, OTG usages of the sending device 110 may be performed in small locations (e.g., a back of car, or sitting in an airplane); in locations or situations that allow a user to utilize only one hand (e.g., standing in crowded bus or train or subway train); in crowded; while the user is walking or traveling, or the like.

In some embodiments, "throwing" of digital object(s) between devices may allow various Peer-to-Peer (P2P) interactions in which files are transferred by selecting and "launching" items towards the destination device by use of fingers; this operation may be user friendly, and the ability to perform this operation may be acquired by users who already know how to use a drag-and-drop interface. For example, in a conventional drag-and-drop interface, a representation of a digital item is dragged towards, and dropped on, a representation of a destination folder or a destination application, which are shown on the touch-screen 111 of the sending device 110, namely, on the same touch-screen 111 which displays the digital object being dragged-and-dropped and/or the source folder. In contrast, a "throw" interface involves dragging and releasing of the representation of the digital object towards, or at the direction of, another device located externally to the sending device 110, and/or towards another device which does not have a representation in the touch-screen 111 of the sending device.

In some embodiments, the touch-screen 111 of the sending device 110 has a relatively small size, e.g., a diagonal size of approximately 2 inches, 3 inches, 4 inches, 7 inches, or the like, less than 10 inches. In some embodiments, the sending device 110 does not include an input unit separate than the touch-screen 111 (e.g., a keyboard, a keypad, or a mouse).

Some embodiments may utilize methods or mechanism in order to detect and/or perform a "throw" of the digital item 131 from the sending device 110 to the receiving device 120, or in order to perform or detect pointing or relative alignment of devices 110 and 120. Some embodiments may utilize inter-device wireless communication, for example, Bluetooth or UWB (e.g., particularly if the distance between the sending device 110 and the receiving device 120 is smaller than 3 meters); IR or NFC (e.g., particularly if the distance between the sending device 110 and the receiving device 120 is smaller than 10 centimeters; and optionally using one or more directional sensors, a three-dimensional accelerator, or a digital compass.

In some embodiments, particularly if the distance between the sending device 110 and the receiving device 120 is greater than 10 centimeters, a "throw" operation may be performed only if it is determined that the sending device 110 points towards the receiving device 120 and/or that devices 110 and 120 are aligned. For example, location information of devices 110 and/or 120 may be determined and used, in addition to or instead of information from directional sensor(s). In some embodiments, security mechanism or pairing mechanisms may be used (e.g., optionally using cryptographic algorithms) in order to address security or pairing requirements.

In some embodiments, sending device 110 and receiving device 120 may have a common PAN connectivity, for example, Bluetooth communication, IEEE 802.11 communication, UWB communication, or the like. Optionally, the user(s) of devices 110 and/or 120 may perform pairing of sending device 110 and receiving device 120. The pairing may be performed using one or more suitable methods or mechanisms, for example, using methods and mechanisms described in United States Patent Application Publication Number 2008/0003978, titled "Method, System, and Apparatus for Improved Bluetooth Security During the Pairing Process".

In some embodiments, the user of the sending device 110 may be required to activate the "throwing" interface in sending device 110 prior to "throwing" digital object 131. The activation invokes applications or algorithms that detect the "throwing" movement, perform relevant calculations, and wirelessly transfer the "thrown" digital object 131 to the relevant destination.

In some embodiments, the user of sending device 110 may be required to set or enter the approximate or estimated distance between sending device 110 and receiving device 120, or to otherwise set the range for the "throwing" operation (e.g., in general, or for a particular "throw" operation). In some embodiments, the user of sending device 110 may select a distance from a list of pre-defined distance values, e.g., using a menu interface or a drop-down list interface.

In some embodiments, optionally, the user of the sending device 110 may be required to set or enter the approximate or estimated perimeter around the receiving device 120 (e.g., as a radius around receiving device 120). The perimeter may be defined by the user for "throw" operations in general, or for a particular "throw" operation. The perimeter is used, for example, such that a digital object 131 "thrown" into the defined perimeter is wirelessly transferred to the receiving device 120; whereas a digital object 131 that was "thrown" but is expected to "land" externally to the defined perimeter is not wirelessly transferred to the receiving device 120. In some embodiments, the user of the sending device 110 may select a perimeter from a list of pre-defined perimeter values, e.g., using a menu interface or a drop-down list interface.

Figure 2:
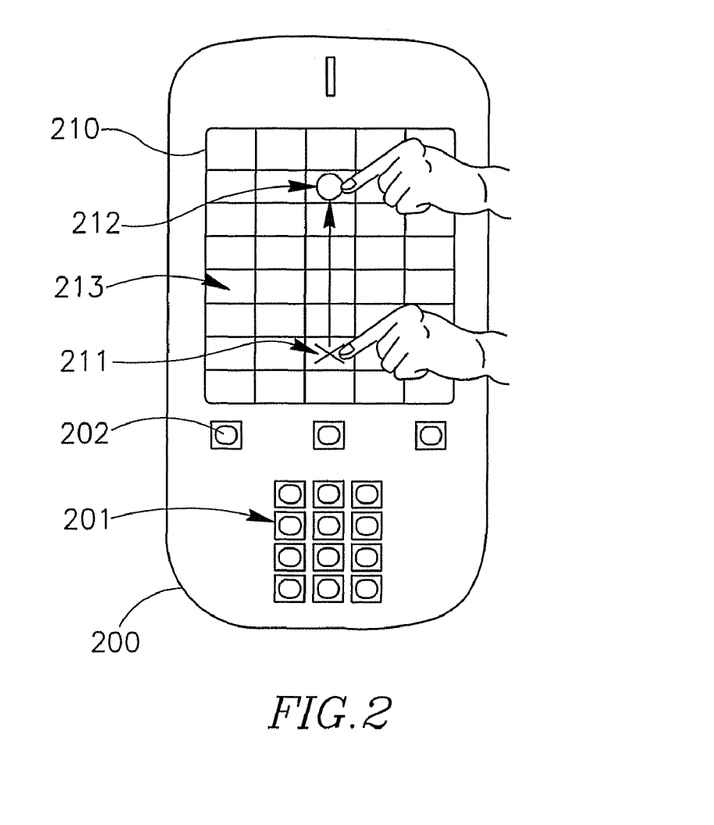
FIG. 2 is a schematic block diagram illustration of a sending device in accordance with some demonstrative embodiments of the invention.

FIG. 2 schematically illustrates a block diagram of a sending device 200 in accordance with some demonstrative embodiments of the invention. Sending device 200 may be a demonstrative example of sending device 110 of FIG. 1.

Sending device 200 includes a touch-screen 210, and optionally includes additional input units, for example, a keypad 201 and one or more keys or buttons 202. Touch-screen 210 is divided into an array or grid of smaller portions, e.g., rectangular or square portions 213; the division may be internal, operable, or invisible to the user of sending device 200.

The user of sending device 200 places the tip of her finger on a representation of a digital object at a first location 211 (denoted "X") in the touch-screen 210. Then, the user rapidly drags the representation of the digital object from the first location to the second location 212 (denoted "O") in the touch-screen 210. The second location 212 does not initially include any representation of a destination, a folder, a file, an application, or another digital object. Once the representation of the digital object reaches the second location 212 (or its vicinity), the user of sending device 200 releases the representation of the digital object, e.g., by raising or removing his finger from the touch-screen 210.

Sending device 200 may calculate or estimate the velocity of the "throw" movement. For example, sending device 200 may measure the distance (denoted d) between the first location 211 and the second location 212, based on vertical and horizontal coordinates associated with each portion 213 of the touch-screen 210. Sending device 200 may measure the time (denoted t) that it took the user's finger to move from the first location 211 to the second location 212. In some embodiments, the velocity of the "throw" movement (denoted v) may be calculated by dividing the distance d by the time t. Optionally, an initial acceleration or estimated acceleration (e.g., in the beginning of the "throw" movement) may be taken into account.

Figure 3:
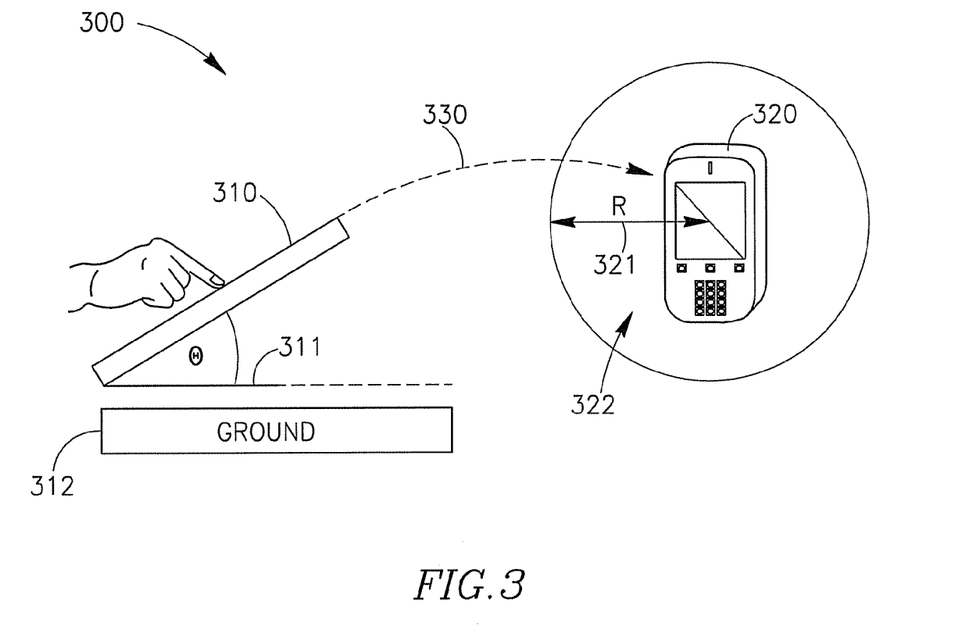
FIG. 3 is a schematic block diagram illustration of a system in accordance with some demonstrative embodiments of the invention.

FIG. 3 schematically illustrates a block diagram of a system 300 in accordance with some demonstrative embodiments of the invention. System 300 includes a sending device 310 (e.g., similar to sending device 110 of FIG. 1) and a receiving device 320 (e.g., similar to receiving device 120 of FIG. 1).

Sending device 310 may be oriented at an angle, denoted $\theta$, relative to the ground 312 or relative to a plane 311 parallel to the ground 312. The sending device 310 may determine, estimate, or sense the value of the orientation angle $\theta$, or 2-axis or 3-axis tilt sensing, for example, using one or more accelerometers, motion sensors, tilt sensors, mechanism utilizing gyroscopes, mechanisms utilizing Hall effect, capacitive liquid based sensors, two-dimensional or three-dimensional accelerometers, digital compasses, or the like. In some embodiments, the sending device 310 may include or may utilize one or more tile sensors described in the following web-page: <www.SensorsPortal.com/HTML/SENSORS/Tilt_Sens_Manuf.htm>. In some embodiments, the orientation angle $\theta$ may be substantially equal to a "throwing" angle or "launching" angle in which the digital object is "thrown" or "launched".

Based on the determined "throw" angle $\theta$, and based on the determined "throw" velocity v, sending device 300 may calculate the horizontal distance of the "throw" operation, namely, the horizontal distance (denoted L) in which the "thrown" digital object is estimated to "land". The horizontal distance L may be calculated using a projectile motion algorithm corresponding to a projectile motion route 330 from the sending device 310 to the receiving device 320. For example, some embodiments may utilize the following equation, in which "g" represents the nominal acceleration due to gravity at sea level (approximately 9.80665 meters per second$^2$):

$$L=(2 v^2 \sin\theta \cos\theta)/g \qquad \text{Equation 1}$$

In some embodiments, the sending device 310 and/or the receiving device 320 are able to calculate or estimate the distance between the sending device 310 and the receiving device 320. For example, the sending device 310 and/or the receiving device 320 may include a GPS receiver or other location-sensing mechanisms able to operate outdoors and/or indoors, and the distance between devices 310 and 320 may be measured using these components.

In some embodiments, precision IEEE 802.11 location or Precision Location Technology (PLT) may be utilized by system 300 in order to determine the distance between devices 310 and 320 and/or their relative location, for example, at sub-meter granularity. In according with PLT, a special data packet is sent (e.g., using IEEE 802.11 communication) back and forth between a wireless client device and at least two wireless Access Points (APs). Each wireless device time-stamps the packet, thereby allowing a determination of the travel time of the packet and a determination of the distance between the client and each AP. Once the wireless client device knows how far it is from the two APs, the wireless client device may triangulate its position. PLT may be used in some locations where GPS location is not utilized, indoors, or in urban environments that limit line-of-sight access to the GPS satellite network. Some embodiments may utilize PLT methods and systems similar to those described in a publication dated Aug. 25, 2005, titled "Intel Preps 'GPS for Wi-Fi' Location Tech", is available at the following webpage: <www.TheRegister.co.uk/2005/08/25/intel_gps_for_wifi/print.html>. Some embodiments may utilize devices, systems and/or methods described in U.S. Pat. No. 7,271,764, titled "Time of Arrival Estimation Mechanism". In some embodiments, determination of the precise locations of the sending device 310 and the receiving device 320 may allow determination of the distance L between devices 310 and 320. In some embodiments, RF fingerprinting technology may be utilized in order to further improve the determination of the locations, for example, utilizing device, systems and/or methods similar to those described in a publication dated Oct. 11, 2004, titled "RF Fingerprinting Pinpoints Location", available online at: <www.NetworkWorld.com/news/tech/2004/101104techupdate.html>.

Prior to performing the "throw" operation, the user of sending device 310 and/or the user of the receiving device 320 may set, select, or otherwise define a value of a parameter indicating a perimeter boundary around the sending device 310 and/or around receiving device 320. For example, in some embodiments, an area around the sending device 310 may be defined, such that only if the receiving device 320 is within this area, and the devices 310 and 320 are paired, then a "throw" movement from the sending device 310 will trigger a wireless transfer of the digital object to the receiving device 320; optionally subject to other proximity settings between the devices 310 and 320. In other embodiments, for example, an area around the receiving device 320 may be defined, such that only if the sending device 310 is within this area, and the devices 310 and 320 are paired, then a "throw" movement from the sending device 310 will trigger a wireless transfer of the digital object to the receiving device 320; optionally subject to other proximity settings between the devices 310 and 320. In still other embodiments, for example, an area around the receiving device 320 may be defined, such that only if the virtual "throwing" of the digital object is estimated to "land" within that area, then a "throw" movement from the sending device 310 will trigger a wireless transfer of the digital object to the receiving device 320; optionally subject to other proximity settings between the devices 310 and 320. For demonstrative purposes, FIG. 3 shows a perimeter around the receiving device 320 defined by a radius 321 (denoted R) of a circle 322 that includes the receiving device 320 at the center thereof. In some embodiments, the selected radius R may be, for example, one foot, two feet, three feet, one meter, or the like. In some embodiments, the configuration of the perimeter may be set in order to improve the success rate of the "throw" operation; optionally while taking into account accuracy requirements, such that only a trusted or authorized device receives the digital object. Other types of perimeters or boundaries, or combinations thereof, may be used.

Figure 4:
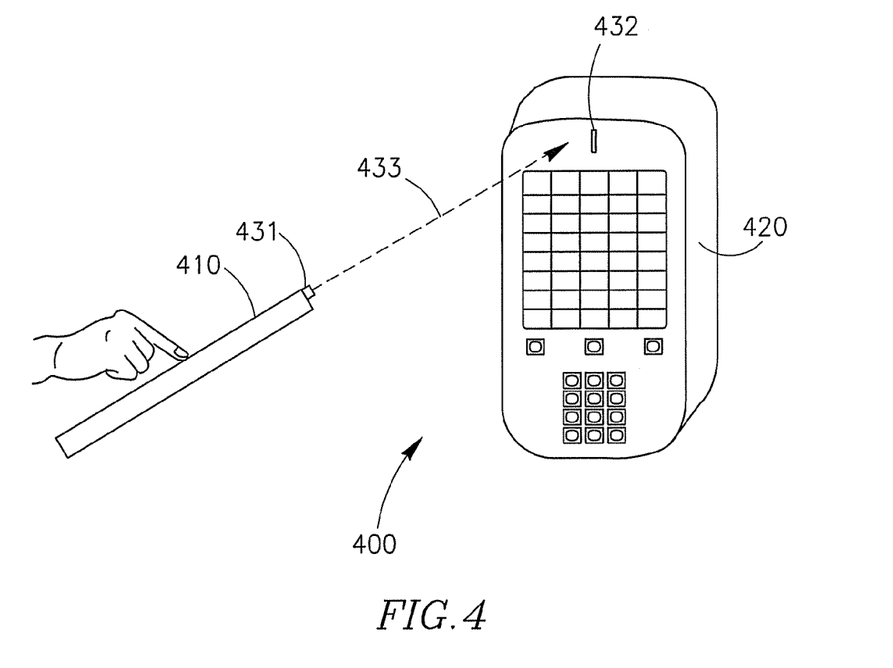
FIG. 4 is a schematic block diagram illustration of a system in accordance with some demonstrative embodiments of the invention.

FIG. 4 schematically illustrates a block diagram of a system 400 in accordance with some demonstrative embodiments of the invention. System 400 includes a sending device 410 (e.g., similar to sending device 110 of FIG. 1) and a receiving device 420 (e.g., similar to receiving device 120 of FIG. 1).

System 400 may utilize IR communication (e.g., in accordance with IrDA specifications) in order to implement and/or improve "throw" operations of digital objects. For example, the sending device 410 includes an IR sensor 431, and the receiving device 420 includes an IR sensor 432. Once the devices 410 and 420 are positioned such that their IR sensors 431 and 432 are aligned, and a Line Of Sight (LOS) 433 exists between them, the "throw" operation may be performed. In some embodiments, for example, the user of the sending device 410 may point and adjust the sending device 410 in order to achieve IR LOS alignment; once the two sensors 431 and 432 are aligned, the sending device 410 may generate a notification (e.g., an audio notification) indicating to the user that system 400 is now ready for a "throw" operation.

Figure 5:
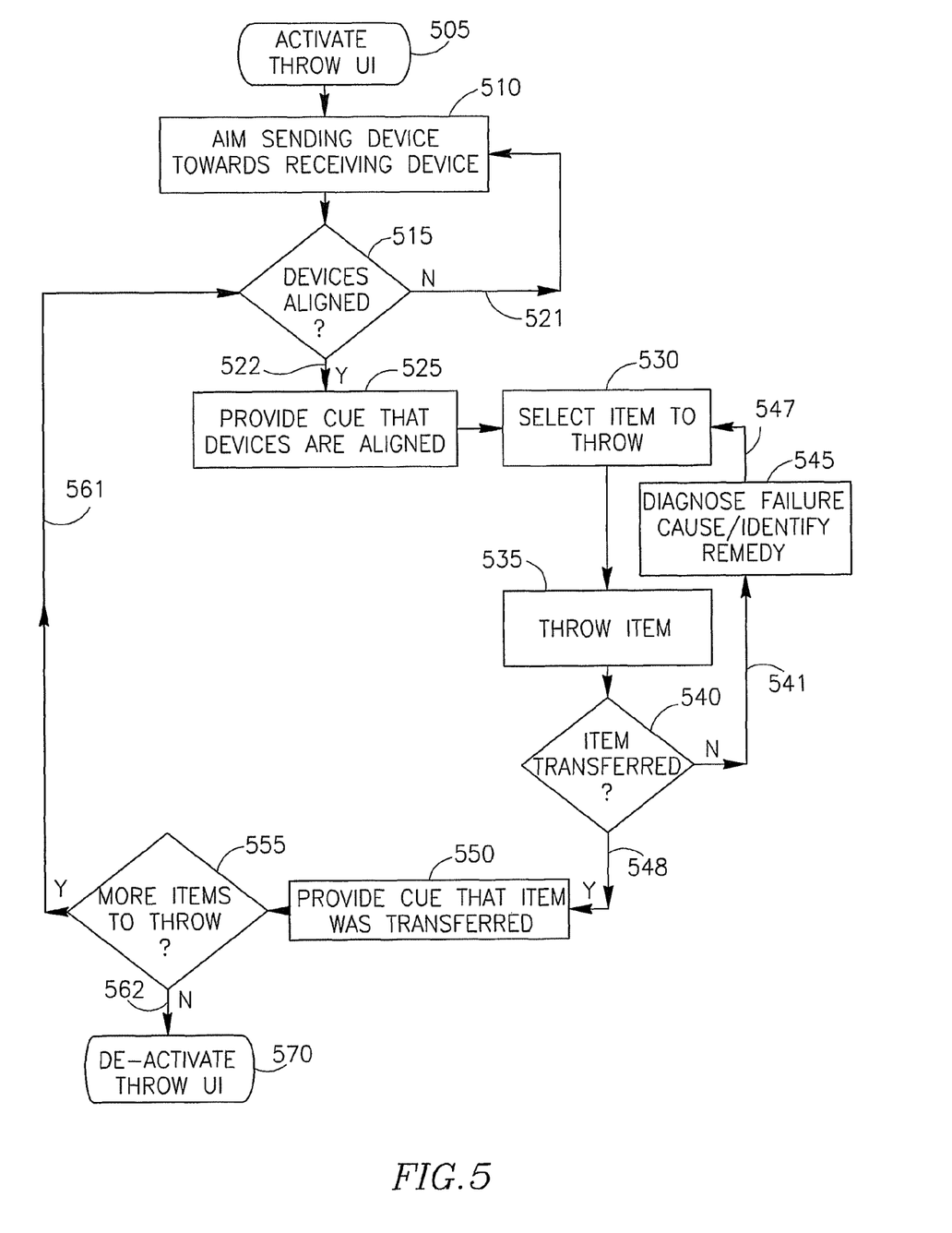
FIG. 5 is a schematic flow-chart of a method of wireless transfer of digital objects in accordance with some demonstrative embodiments of the invention.

FIG. 5 is a schematic flow-chart of a method of wireless transfer of digital objects in accordance with some demonstrative embodiments of the invention. Operations of the method may be used, for example, by system 100 of FIG. 1, by sending device 200 of FIG. 2, by system 300 of FIG. 3, by system 400 of FIG. 4, and/or by other suitable devices or systems.

In some embodiments, the method may include, for example, activating or turning-on the "throw" UI (block 505), e.g., in the sending device.

In some embodiments, the method may include, for example, aiming the sending device (the source device) towards the receiving device (the destination device) (block 510); and then checking whether or not the sending device and the receiving device are aligned (block 515).

If the sending device and the receiving device are not aligned (arrow 521), then the method may include repeating the operation of block 510, namely, re-aiming or modifying the orientation of the sending device towards the receiving device.

In contrast, if the sending device and the receiving device are aligned (arrow 522), the method may proceed with the operations of block 525 and onward; for example, as indicated at block 525, the method may include providing a cue or notification that the sending device and the receiving device are aligned.

In some embodiments, the method may include, for example, selecting a digital object to be "thrown" from the sending device to the receiving device (block 530); as well as "throwing" the digital object from the sending device to the receiving device (block 535). These operations may include, for example, identifying a selection of a representation of the digital object by detecting contact on a touch-sensitive surface of the sending device at a contact position that corresponds to the representation; identifying a directional movement of the contact position on the touch-sensitive surface; and in response to the directional movement, wirelessly transferring data corresponding to the digital object to a nearby device (namely, the receiving device) located generally in the direction of said directional movement.

In some embodiments, identifying the "throwing" directional movement may optionally include, for example, detecting whether or not the directional movement is directed generally towards the nearby computing device (namely, the receiving device). This may be performed, for example, based on calculation of the velocity of the directional movement, the tilt angle of the sending device, the estimated or calculated distance between the sending device and the receiving device, and the estimated or calculated "throwing" range (e.g., based on the calculated velocity and the tilt angle). In some embodiments, for example, the sending device may determine whether or not the "throwing" directional movement has properties (e.g., velocity and tilt angle) which allow the "thrown" digital object to virtually "land" within a distance that is within a pre-defined "throwing range" associated with the sending device and/or the receiving device. In some embodiments, the sending device may determine that the directional movement is not directed towards the nearby computing device, but rather, for example, away from the nearby computing device, or towards the user of the sending device; may avoid performing a wireless transfer of the digital object from the sending device to the receiving device; and may notify the user of the sending device that a "throw" operation was not performed.

In some embodiments, the method may include, for example, checking whether or not the digital object was successfully transferred from the sending device to the receiving device (540).

If the digital object was not successfully transferred from the sending device to the receiving device (arrow 541), then the method may include, for example, diagnosing the cause(s) for the failure and optionally identifying remedies to the failure (block 545), as well as repeating the operations of block 530 and onward (arrow 547), e.g., to re-"throw" the digital object.

In contrast, if the digital object was successfully transferred from the sending device to the receiving device (arrow 548), then the method may include, for example, providing a cue or notification that the digital object was successfully transferred from the sending device to the receiving device (block 550), and proceeding with the operations of block 555 and onward.

In some embodiments, the method may include, for example, checking (or asking the user of the sending device) whether or not additional digital object(s) are to be "thrown" from the sending device to the receiving device (block 555).

If additional digital object(s) are to be "thrown" from the sending device to the receiving device (arrow 561), then the method may include, for example, repeating the operations of block 515 and onward.

In contrast, if no additional digital object(s) are to be "thrown" from the sending device to the receiving device (arrow 562), then the method may include, for example, deactivating or turning-off the "throw" UI (block 570), e.g., in the sending device.

Other operations may be used in accordance with some embodiments of the invention.

Figure 6:
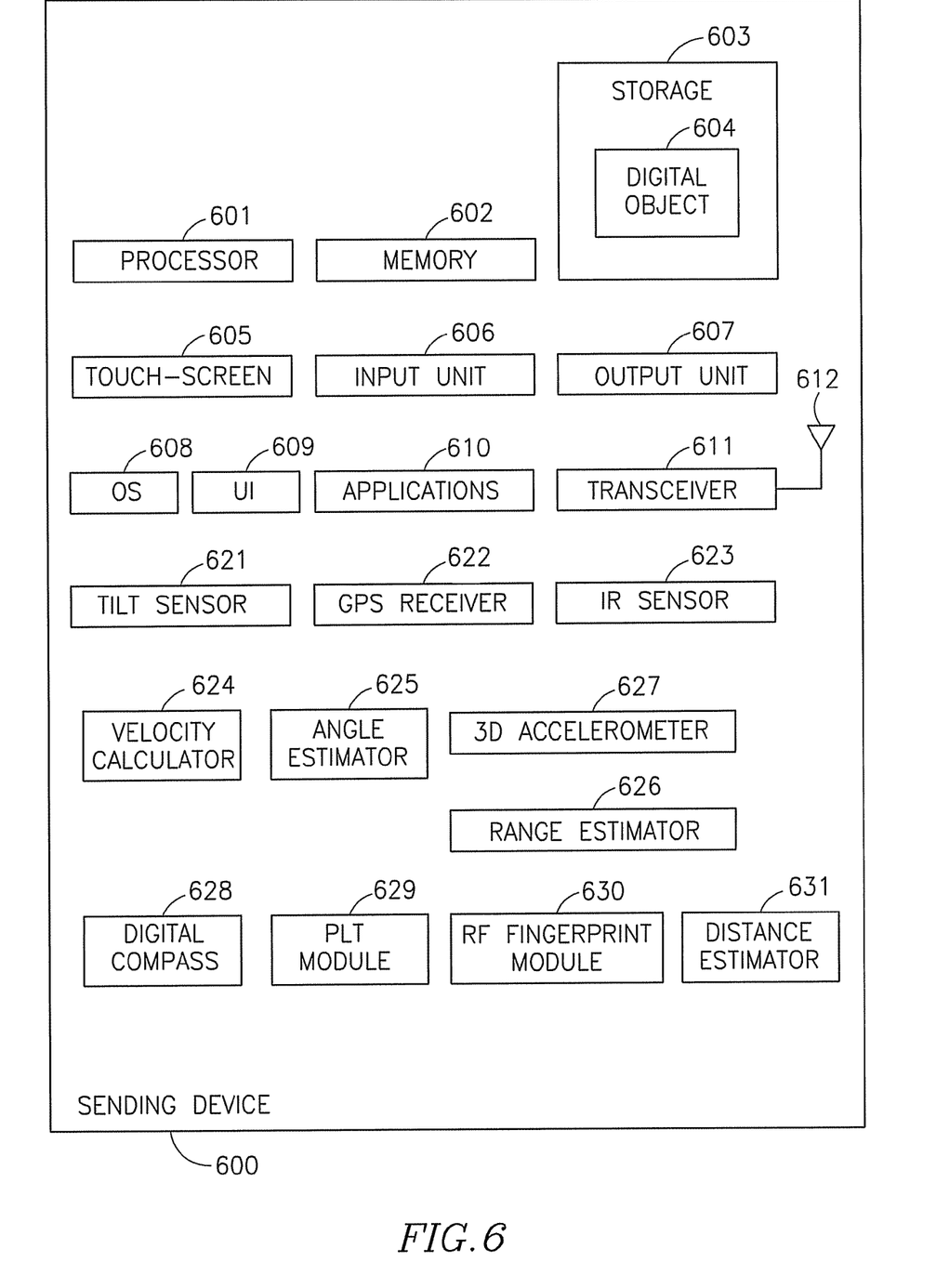
FIG. 6 is a schematic block diagram illustration of a sending device in accordance with some demonstrative embodiments of the invention.

FIG. 6 schematically illustrates a block diagram of a sending device 600 in accordance with some demonstrative embodiments of the invention. Sending device 600 may be a demonstrative example of sending device 110 of FIG. 1, of sending device 200 of FIG. 2, of sending device 310 of FIG. 3, of sending device 410 of FIG. 4.

Sending device 600 may include one or more hardware components and/or software components, for example: a processor 601; a memory unit 602; a storage unit 603 able to store a digital object 604; a touch-screen 605; optionally, an additional input unit 606 (e.g., a keypad, a keyboard, or one or more buttons); optionally, an additional output unit 607 (e.g., audio speakers); an Operating System (OS) 608 associated with a "throw"-capable User Interface (UI) 609; one or more software applications 610; and a wireless transceiver 611 associated with one or more antennas 612. Optionally, sending device 600 may further include one or more logical units, hardware components and/or software components to perform operations described herein, for example, a tilt sensor 621, a GPS receiver 622, an IR sensor 623, a velocity calculator 624, a "throw" angle estimator 625, a "throw" range estimator 626, a three-dimensional accelerometer 627, a digital compass 628, a PLT module 629, a RF fingerprinting module 630, a distance estimator 631 to estimate a distance from a nearby device, and/or other suitable components.

In some embodiments, the sending device 600 may be configured to perform one or more operations upon detection of a "throwing" movement, for example, to wirelessly copy the digital object 604 (or data corresponding thereto) from the sending device 600 to a target receiving device; to wirelessly move the digital object 604 (or data corresponding thereto) from the sending device 600 to the target receiving device (e.g., by wirelessly copying the digital object 604 to the sending device, and deleting the original digital object 604 from the storage unit 603 of the sending device 600); to automatically and wirelessly copy or move a license (e.g., DRM license, DRM policy, or the like), associated with the digital object 604, from the sending device 600 to the target receiving device, in conjunction with a respective copy or move of the digital object 604; or other suitable operations.

While certain features of the invention have been illustrated and described herein, many modifications, substitutions, changes, and equivalents may occur to those skilled in the art. Therefore, the appended claims are intended to cover all such modifications and changes.

What is claimed is:

1. A method comprising:
   identifying a selection of a representation of a digital object stored in a mobile device by detecting contact on a touch-sensitive surface of the mobile device at a contact position that corresponds to said representation;
   identifying a directional movement of said contact position on the touch-sensitive surface
   calculating a throwing range of the digital object based on a throwing velocity and a tilt angle of the wireless device relative to the ground; and
   in response to said directional movement, wirelessly transferring data corresponding to the digital object to a nearby computing device if the nearby computing device is within the throwing range.

2. The method of claim 1, comprising:
   detecting whether or not the directional movement is directed generally towards the nearby computing device.

3. The method of claim 1, wherein detecting contact comprises detecting contact by a finger of a user of the mobile device.

4. The method of claim 1, comprising:
wirelessly transferring the data corresponding to digital object from the mobile device to the nearby computing device based on at least one parameter selected from the group consisting of:
an estimated velocity of the directional movement;
an estimated orientation angle of the mobile device relative to ground; and
an estimated distance between the mobile device and the nearby computing device.

5. The method of claim 1, comprising:
checking whether or not the mobile device and the nearby computing device are in alignment; and
if the mobile device and the nearby computing device are in alignment, notifying a user of the mobile device that the mobile device and the nearby computing device are in alignment.

6. The method of claim 1, comprising:
checking whether or not a wireless transfer of the data corresponding to the digital object is successful;
if the wireless transfer of the data corresponding to the digital object is successful, notifying a user of the mobile device that the wireless transfer of the data corresponding to the digital object is successful; and
if the wireless transfer of the data corresponding to the digital object is unsuccessful, notifying a user of the mobile device that the wireless transfer of the data corresponding to the digital object is unsuccessful.

7. The method of claim 1, wherein the touch-sensitive surface comprises a touch-screen.

8. A wireless device comprising:
a touch-sensitive surface to receive touch-based user input;
a storage unit to store a digital object;
a user interface to identify that a user of the wireless device rapidly drags on the touch-sensitive surface a representation of the digital object in a directional movement;
a processor to calculate a throwing range of the digital object based on a throwing velocity and a tilt angle of the wireless device relative to the ground ; and
a wireless transmitter to wirelessly transmit data corresponding to the digital object to a nearby computing device if the nearby computing device is within the throwing range.

9. The wireless device of claim 8, comprising:
the processor to calculate the throwing velocity of the digital object based on a measured distance of the directional movement on the touch-sensitive surface and a measured time of the directional movement on the touch-sensitive surface.

10. The wireless device of claim 9, comprising:
one or more sensors to sense the tilt angle of the wireless device relative to ground.

11. The wireless device of claim 8, wherein the processor is to estimate a distance between the wireless device and the nearby computing device based on Global Positioning System (GPS) information.

12. The wireless device of claim 8, wherein the processor is to estimate a distance between the wireless device and the nearby computing device based on Precision Location Technology (PLT).

13. The wireless device of claim 8, wherein the processor is to estimate a distance between the wireless device and the nearby computing device based on Radio Frequency fingerprinting.

14. The wireless device of claim 8, comprising:
an InfraRed sensor to check whether a line of sight exists between the InfraRed sensor and an InfraRed sensor of the nearby computing device,
wherein, if the line of sight exists, the user interface is to notify the user of the wireless device that the wireless device and the nearby computing device are in alignment.

15. The wireless device of claim 8, wherein the wireless device comprises a device selected from the group consisting of: a Personal Digital Assistant (PDA), a cellular phone, a handheld device, a portable audio player, a portable video player, a portable audio/video player, a portable media player, an Ultra Mobile Device (UMD), an Ultra Mobile Personal Computer (UMPC), a Mobile Internet Device (MID), and a tablet computer.

16. The wireless device of claim 8, wherein the touch-sensitive surface comprises a touch-screen.

* * * * *

UNITED STATES PATENT AND TRADEMARK OFFICE
CERTIFICATE OF CORRECTION

| | | |
|---|---|---|
| PATENT NO. | : 8,077,157 B2 | Page 1 of 1 |
| APPLICATION NO. | : 12/058780 | |
| DATED | : December 13, 2011 | |
| INVENTOR(S) | : Uttam K. Sengupta et al. | |

It is certified that error appears in the above-identified patent and that said Letters Patent is hereby corrected as shown below:

In column 13, line 38, in claim 8, delete "ground ;" and insert -- ground; --, therefor.

Signed and Sealed this
Fourteenth Day of February, 2012

David J. Kappos
*Director of the United States Patent and Trademark Office*